United States Patent [19]

Wichman et al.

[11] Patent Number: 5,630,108
[45] Date of Patent: May 13, 1997

[54] FREQUENCY INDEPENDENT PCMCIA CONTROL SIGNAL TIMING

[75] Inventors: Shannon A. Wichman; John Cornish, both of Dallas; Qadeer A. Qureshi, Round Rock, all of Tex.

[73] Assignee: Texas Instruments Incorporated, Dallas, Tex.

[21] Appl. No.: 375,317

[22] Filed: Jan. 18, 1995

[51] Int. Cl.[6] ................................................ G06F 1/10
[52] U.S. Cl. ...................... 395/556; 395/309; 395/559
[58] Field of Search .................................. 395/550, 309

[56] References Cited

U.S. PATENT DOCUMENTS

| | | | |
|---|---|---|---|
| 5,025,412 | 6/1991 | Dalrymple et al. | 364/DIG. 2 |
| 5,381,543 | 1/1995 | Blomgren et al. | 395/550 |
| 5,452,330 | 9/1995 | Goldstein | 375/257 |

*Primary Examiner*—Thomas M. Heckler
*Attorney, Agent, or Firm*—J. Dennis Moore; James C. Kesterson; Richard L. Donaldson

[57] ABSTRACT

A bus interface timing unit responsive to a system clock signal having a frequency that is selectable among a plurality of frequencies. The bus interface timing unit provides timing signals to a bus interface unit that performs functions involving control signals having predetermined timing requirements, such timing requirements being substantially independent of the frequency of the system clock signal. The bus interface timing unit includes a signal generator (20) which is responsive to the system clock signal, and which generates the control signals. These control signals include at least one event signal controlling a time duration in which a predetermined event occurs. Also included is a control unit (10), responsive to a signal representative of the selected frequency of the system clock signal, that controls the signal generator such that the event signal timing is generated in accordance with the predetermined requirements the selected frequencies.

10 Claims, 1 Drawing Sheet

FREQUENCY INDEPENDENT PCMCIA CONTROL SIGNAL TIMING

BACKGROUND OF THE INVENTION

1. Field of the Invention

The present invention relates to microprocessor-based computer bus interface controllers, and more particularly relates to timing control of signals therein.

2. Background Art

The Personal Computer Memory Card International Association ("PCMCIA") interface allows a variety of external I/O and memory cards to be attached to a microcomputer by way of a specially configured socket. The signal timings for the PCMCIA interface are defined to predetermined values having a predetermined range. Timings for bus signals are typically derived utilizing a readily available clock, such as the system clock. However, modern microcomputers have system clocks that run at frequencies that can change, for example under selection control by a user. This presents a problem relating to the maintenance of the aforementioned defined PCMCIA timings.

The present invention provides a novel apparatus that provides an elegant solution to the aforementioned problem, permitting the maintenance of optimal bus signal timings, even if the system clock's frequency changes.

SUMMARY OF THE INVENTION

In accordance with the principals of the present invention there is provided a bus interface timing unit responsive to a system clock signal having a frequency that is selectable among a plurality of frequencies, the bus interface timing unit providing timing signals to a bus interface unit that performs functions involving control signals having predetermined timing requirements wherein the timing requirements are substantially independent of the frequency of the system clock signal. The bus interface timing unit includes a signal generator, responsive to the system clock signal, that generates the control signals, the control signals including at least one event signal controlling a time duration in which a predetermined event occurs. The bus interface timing unit also includes a unit responsive to a signal representative of the selected frequency of the system clock signal that controls the signal generator such that the event signal timing is generated in accordance with the predetermined timing requirements for the selected frequencies.

DESCRIPTION OF THE DRAWINGS

The above set forth and other features of the present invention are made more apparent in the ensuing Detailed Description of the Preferred Embodiments, when read in conjunction with the attached Drawings, wherein.

DETAILED DESCRIPTION OF THE PREFERRED EMBODIMENTS

Figure 1:
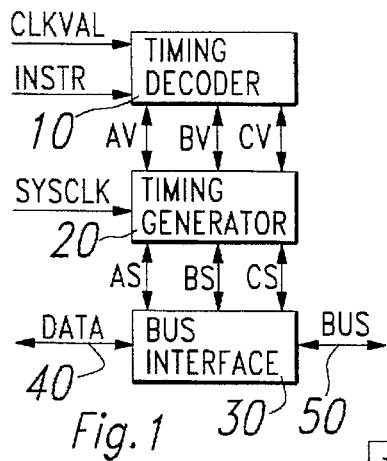
FIG. 1 is a block diagram of the preferred embodiment of the present invention.

FIG. 1 is a block diagram of the preferred embodiment of the present invention. A timing decoder receives a digital value, CLKVAL, representing the frequency of the system clock of a computer system (not shown) in which the embodiment shown in FIG. 1 would be utilized. This frequency can be one of a plurality of selectable frequencies. Timing decoder 10 also receives an instruction, INSTR, comprised of an OP code identifying the function to be performed, and an address identifying the address of data to be operated on in the present instruction or identifying a location where data is to be stored in the present instruction. In response CLKVAL and INSTR, timing decoder 10 provides as outputs three values, AV, BV and CV which identify the duration of three portions of a bus cycle in which a data transfer operation is to occur. These three values, AV, BV, CV, are provided to a timing generator 20, which also receives as an input a system clock signal, SYSCLK. Timing generator 20 generates three signals, AS, BS, CS, which are the actual timing signals for the aforementioned three portions of the bus cycle, and provides the signals to a bus interface unit 30. Bus interface unit 30 handles data transfers between a data path 40 identified as DATA, which may be an internal data path, internal bus, or the like, and a bus 50, such as a PCMCIA bus, having predetermined timing requirements.

Figure 2:
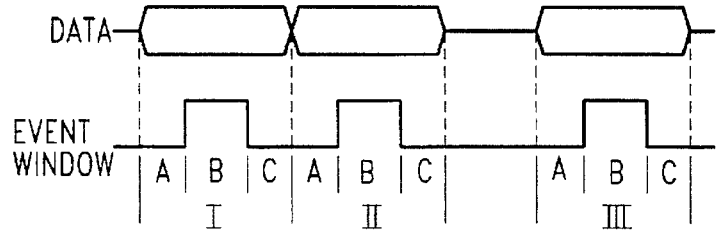
FIG. 2 is a signal timing diagram illustrating timing requirements satisfied by the preferred embodiment of the present invention.

FIG. 2 illustrates the timing requirements mentioned above. Three bus cycles, I, II, III, are shown, in which a data transfer operation occurs. The top portion of the figure, identified as DATA, represents data signals on data path 40 in each of the three cycles, while the bottom portion of the figure, identified as EVENT WINDOW, represents signals defining the event windows for each cycle, within which a data transfer is allowed. In both top and bottom portions of the figure, vertical extent represents signal level, while horizontal extent time, left to right representing increasing time.

Looking at cycle I, it can be seen that the bus cycle comprises three portions, A, B and C. Enablement of the event window is deferred for a period A to allow the data on data path 40 to stabilize. Then, during portion B the data is sensed. The event window is terminated a duration C before the end of the cycle to assure the capture of the data being sensed on data path 40 before the data is removed from data path 40, thus assuring the integrity of the data so captured. As can be seen in cycles II and III, these three portions A, B, C, are the same for any similar event performed by the bus interface 30. As mentioned above, the timings of portions A, B and C, are controlled and determined by signals AS, BS and CS, respectively.

Figure 3:
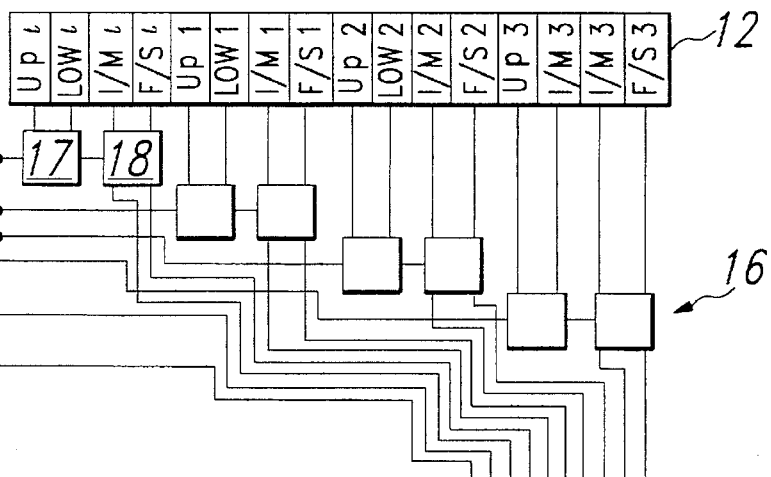
FIG. 3 is a block diagram of the timing decoder of FIG. 1.

FIG. 3 is a diagram of the timing decoder 10 of FIG. 1. Shown are a portion of the configuration registers 12 of the timing decoder 10, a read-only memory ("ROM") 14 and logic circuitry 16 interfacing between registers 12 and ROM 14. The configuration registers 12 store four sets of values, each such set of values being associated with an address domain to which an address of data to be transferred by way of bus 50 (FIG. 1) may be mapped. Values stored for each such domain are an upper limit, e.g. UPO, a lower limit, e.g. LOWO, a bit value identifying whether the attached device is an I/O device or a memory device, e.g. I/MO, and a bit value representing whether the device is a fast device or a slow device, e.g. F/SO. Logic circuitry 16 comprises a set of four pairs of logic devices, each such pair being identical. The following explanation will be with respect to only the address domain identified with UPO and LOWO. However it will be understood that the operation for each of the other domains is identical.

As mentioned above, the instruction, INSTR, is comprised of two portions, namely an address portion, ADR, and an operational code portion OP. ADR is applied to a comparator 17 which compares the address ADR with UPO and LOWO to determine whether ADR is within the range of the zero address domain. If it is not, comparator 17 does not respond. If ADR is within the domain of UPO, LOWO, comparator 17 sends a signal to gate 18 which enables the application of the bit values stored at I/MO and F/SO to ROM 14, onto unique address lines thereof, as shown. OP is applied directly to other uniquely defined address line inputs to ROM 14, as shown, as is CLKVAL. Together, all of the signals lines entering the top of ROM 14 in FIG. 3 provide an address to ROM 14. In response thereto, ROM 14 provides as an output three values, AV, BV and CV, as shown.

Values AB, BV and CV are uniquely defined values, expressed in numbers of clock cycles, corresponding to the predefined timing requirements associated with the operation identified by OP, appropriate for the type of device identified by I/Mn and speed identified by F/Sn, where n is the selected value 0–3, for a system clock having a frequency represented by CLKVAL. As mentioned above, the frequency represented by CLKVAL can be any of a plurality of selectable frequencies.

Figure 4:
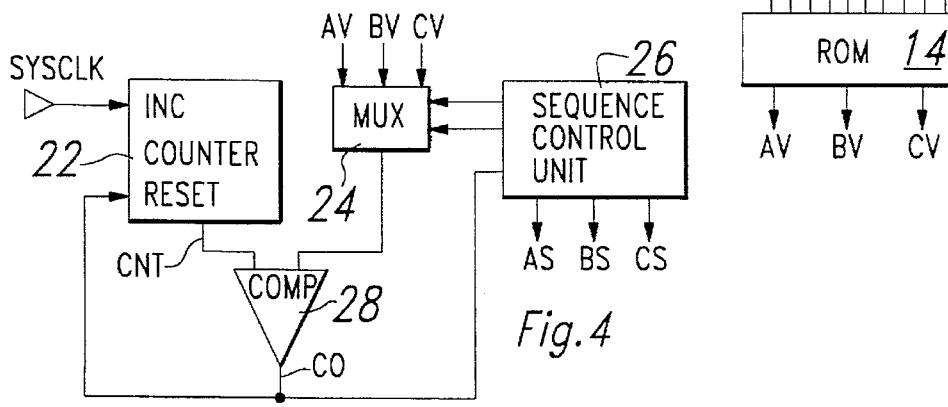
FIG. 4 is a block diagram of the timing generator of FIG. 1.

FIG. 4 is a detailed diagram of timing generator 20 showing how values AV, BV and CV are utilized to generate the actual timing signals AS, BS and CS, respectively. Timing generator 20 comprises a counter 22 having a reset input and also having a increment input receiving the system clock signal, SYSCLK. Also shown is a multiplexer 24 receiving signals AV, BV and CV. Multiplexer 24 is controlled by a sequence control unit 26 which causes the selection of AV, BV or CV, as the case may be. The outputs of counter 22 and multiplexer 24 are compared in comparator 28. When the values at the input of comparator 28 are identical, signal line CO goes active. As can be seen, line CO is connected to the reset input to counter 22, as well as to an input of sequence control unit 26. Thus, when line CO goes active, counter 22 is reset. In addition, sequence control unit 26 responds to line CO so as to sequence through the passage of values AV, BV and CV for comparison in comparator 28, so as thus to effect the generation of the respective timing signals, as mentioned hereinabove.

Figure 5:
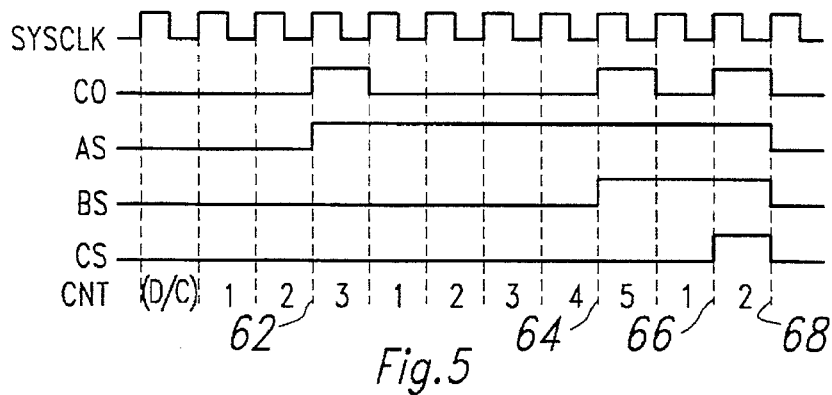
FIG. 5 is a signal timing diagram showing the timing interrelationship of various signals identified in FIG. 4.

The operation of sequence control unit 26 to control multiplexer 24 and to generate signals AS, BS and CS, will now be described in detail with reference to FIG. 4 and FIG. 5 together. FIG. 5 is a signal diagram showing the relative timings of the following signals: SYSCLK, CO, AS, BS, CS and CNT. As shown at the top of FIG. 5, the SYSCLK provides a continuous series of clock pulses, to which the apparatus of FIG. 4 is referenced. In the description that follows, it is assumed that the value AV is 3, the value BV is 5 and the value CV is 2. These numbers are chosen arbitrarily simply for the purposes of illustration. These values may be any values, and will depend upon the particular timing requirements and system clock frequency, as described above.

Returning to the description of operation of the timing generator 20, at the beginning of the sequence the value 3, representing AV, is applied to multiplexer 24 which passes it through to one input of comparator 28. Since counter 22 was reset, either in the immediately previous cycle, or some cycle before that, the value of CNT is "don't care", represented by D/C in FIG. 5. Counter 22 immediately begins counting in response to SYSCLK. When CNT reaches the value 3, being the same value of AV being applied to the other input of comparator 28, the output signal line CO goes active, as shown. In response, sequence control unit 26 causes line AS to go active as well, presenting a rising edge at time 62, as shown. This marks the end of portion A of the cycle depicted in FIG. 2. It will be noted that this occurs exactly three cycles after the beginning of the sequence. Finally, also in response to detection of the rising edge on line CO, sequence control unit causes multiplexer 24 to provide the value BV to comparator 28.

The rising edge of CO having caused counter 22 to reset, CO goes inactive, and counter 22 begins counting again, this time for five cycles, corresponding to the value BV, at which time 64 CO again goes high. In response thereto, counter 22 is reset and sequence control unit 26 presents a rising edge on line BS, as shown, and causes multiplexer 24 to present value CV to comparator 28. Counter 22 having been reset the line CO goes inactive and count proceeds for two cycles, corresponding to the value of CV, at which time CO goes active again, causing a reset of counter 22, and in response to which sequence control unit 26 puts a rising edge on line CS, returns multiplexer 24 to AV, and resets itself one cycle later, as shown. At this point in time the arrangement is reset and ready for another operation.

It is thus been shown that a very flexible and programmable timing control arrangement for a bus interface has been described above in detail. The embodiment described herein accommodates a plurality of selectable clock frequencies and serves to maintain within fixed tolerances signal timings associated with bus interface signaling. It will be understood, however, that various alterations, modifications and improvements will readily occur to those skilled in the art. For example, the timing decoder shown in FIG. 3 could advantageously be implemented in the form of an array of multiplexers. In fact, an array of multiplexers would result in a reduced gate count, which is generally considered desirable. Such a modification can be readily made by those of ordinary skill in this art area. All such alterations, modifications and improvements as are made obvious by this disclosure are intended to be part of this description though not expressly stated herein, and are intended to be within the spirit and scope of the invention. Accordingly the foregoing description is by way of example only, and not limiting. The invention is limited only as defined in the following claims and equivalence thereto.

What is claimed is:

1. In a data processing system having a system clock that clocks data processing events at a system clock frequency, a bus interface timing unit, responsive to a system dock value signal representing the frequency of said system dock that is selectable among a plurality of frequencies, for providing control signals to a bus interface unit that controls the transfer of signals across said interface, under control of at least one of said control signals having predetermined timing requirements, wherein said timing requirements are substantially independent of the frequency of said system clock signal and depend upon an operation to be performed in said data processing system, comprising:

signal generation means, responsive to said system clock signal, for generating said at least one control signal; and means responsive to a signal representative of the selected frequency of said system clock signal and for controlling said signal generation means such that said control signal is generated in accordance with said predetermined timing requirements for said selected frequencies, regardless of the frequency of said system clock.

2. A timing unit according to claim 1 wherein said signal generation means comprises:

a counter;

storage means for storing at least a first timing value; and a comparator for comparing the count value in said counter and said first timing value, and for providing said at least one control signal in response to the detection of equality of said count value and said first timing value.

3. A timing unit according to claim 2 wherein said means responsive to a signal comprises:

decode means for receiving said system dock value signal, for receiving a signal representative of said operation to be performed by said data processing system and for providing said first timing value for storage in said storage means.

4. A timing unit according to claim 3 wherein said decode means provides a second timing signal with said first timing signal, and wherein said data processing system further comprises:

a multiplexer having as its inputs said first and said second timing signals; and a sequence control unit that controls said multiplexer to provide, in sequence, said first timing signal and said second timing signal to said comparator.

5. A timing unit according to claim 2 wherein said storage means comprises a read only memory.

6. A timing unit according to claim 2 wherein said storage means comprises an array of multiplexers.

7. A bus interface timing unit for a data processing system having a system clock that clocks data processing events at a system clock frequency, responsive to a system clock value signal representing the frequency of said system dock that is selectable among a plurality of frequencies, for providing control signals to a bus interface unit that controls the transfer of signals across said interface under control of at least one of said control signals, said transfer having predetermined timing requirements, wherein said timing requirements are substantially independent of the frequency of said system clock signal and depend upon an operation to be performed in said data processing system, comprising:

a timing decoder, responsive to said system clock value signal and responsive to an instruction for an operation to be performed in said data processing system, and providing timing control signals representing said predetermined timing requirements; and a timing generator, responsive to said timing control signals and generating transfer timing signals for controlling the timing of the transfer of signals across said interface in conformance with said predetermined timing requirements.

8. A bus interface timing unit according to claim 7, wherein said timing decoder comprises:

a read only memory responsive to said system clock value signal and to said instruction, providing said timing control signals from storage locations therein.

9. A bus interface timing unit according to claim 8, wherein said timing requirements are dependent on an address range of data to be transferred in association with the execution of said instruction, and wherein said timing decoder further comprises:

a memory for storing values representing a plurality of address ranges;

a plurality of comparators connected to said memory and receiving an address associated with said instruction, for comparing said address with said plurality of address range values, and generating a timing signal associated with apparatus in said data processing system mapped to one of said address ranges; and a read only memory responsive to said system dock value signal, to said instruction and to said timing signal, and providing said timing control signals.

10. A bus interface timing unit according to claim 9, wherein said memory is further for storing timing said timing signals, further comprising a plurality of gates activated by said comparators for selectably applying said timing signals to said read only memory in response to the operation of said comparators.

* * * * *